United States Patent
Carrier

[11] 3,981,042
[45] Sept. 21, 1976

[54] PILE CARPET CASTOR

[76] Inventor: Vernon J. Carrier, 25830 Viana St., Lomita, Calif. 90717

[22] Filed: Nov. 20, 1975

[21] Appl. No.: 633,684

[52] U.S. Cl. .................................. 16/47; 16/45
[51] Int. Cl.² .................................. B60B 33/00
[58] Field of Search .................................. 16/45, 47

[56] References Cited
UNITED STATES PATENTS

| | | | |
|---|---|---|---|
| 759,299 | 5/1904 | Myers | 16/45 |
| 1,305,535 | 6/1919 | Grabowiecki | 16/45 |
| 2,301,385 | 11/1942 | Ehrgott | 248/346.1 |
| 3,140,506 | 7/1964 | Arenson | 16/47 |
| 3,899,801 | 8/1975 | Carrier | 16/45 |

FOREIGN PATENTS OR APPLICATIONS

| | | | |
|---|---|---|---|
| 925,081 | 5/1963 | United Kingdom | 16/47 |
| 565,138 | 10/1944 | United Kingdom | 16/47 |

OTHER PUBLICATIONS
Hardware Ace Publication, Apr. 1, 1965, P. 109.

Primary Examiner—Werner H. Schroeder
Assistant Examiner—Conrad L. Berman
Attorney, Agent, or Firm—Edward D. O'Brian

[57] ABSTRACT

An improved castor for use with pile carpet can be built so as to include a plurality of separate wheels located on a sleeve which in turn is rotatably mounted on an axle. Holders are provided to secure the wheels in place on the sleeve in side-by-side relationship so that normally the wheels will rotate together as a unit and so that the wheels are capable of rotating independently of one another. The wheels are provided with non-pointed bosses extending from their peripheries which are intended to engage a pile carpet so as to avoid crushing of the piles of the carpet. The structure is intended to distribute weight on the castor over a reasonably large area of the carpet and is intended to facilitate the castor being turned or rotated during use without the movement of the castor detrimentally affecting the carpet.

4 Claims, 5 Drawing Figures

U.S. Patent  Sept. 21, 1976  3,981,042
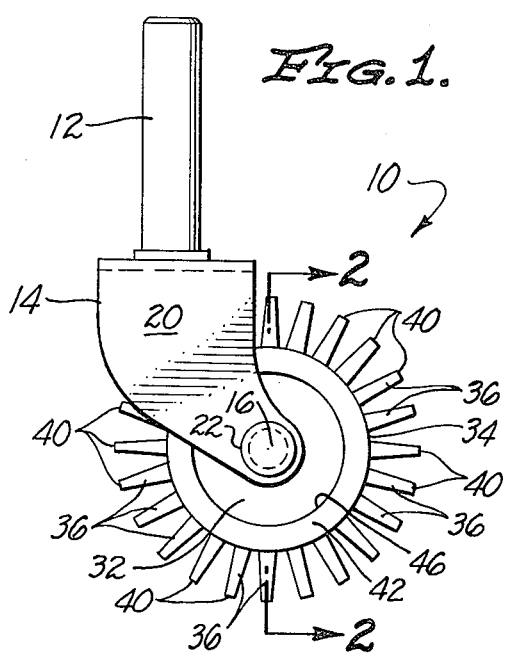
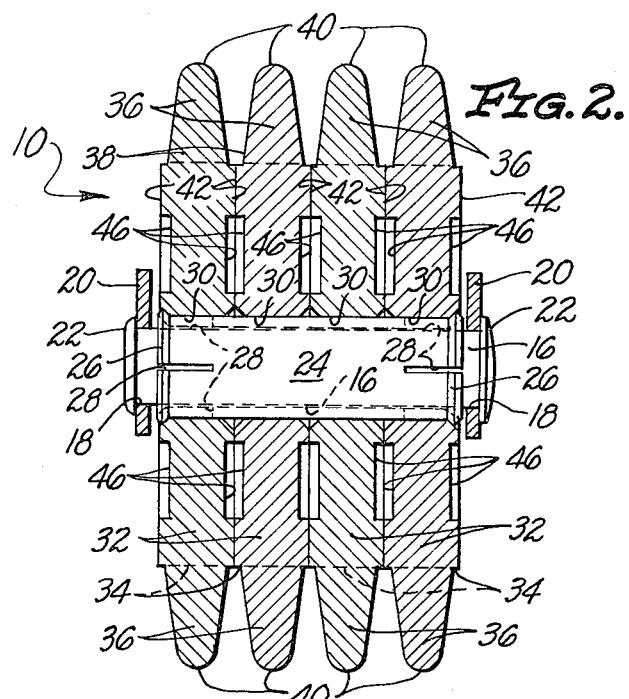
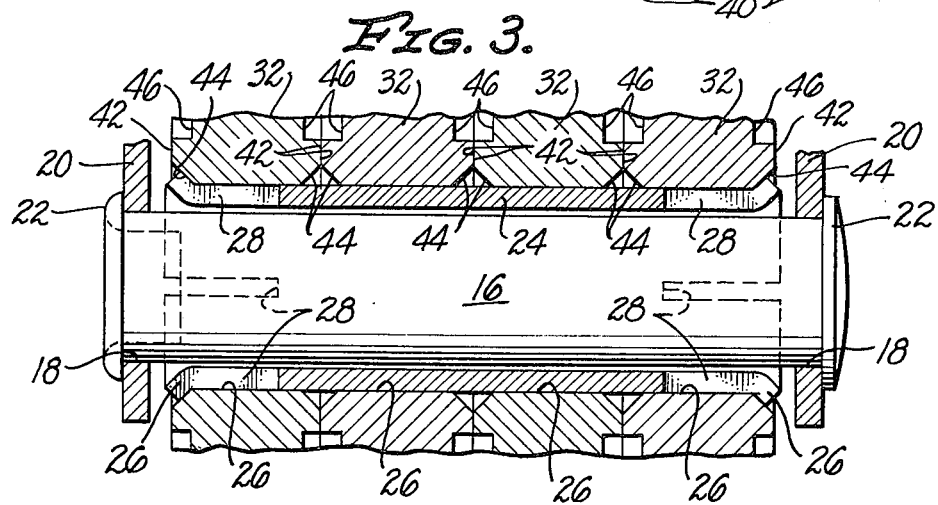
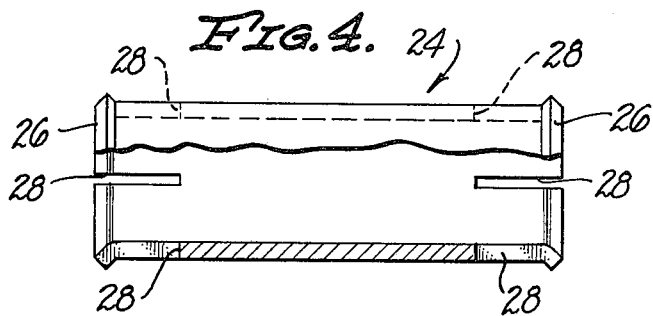
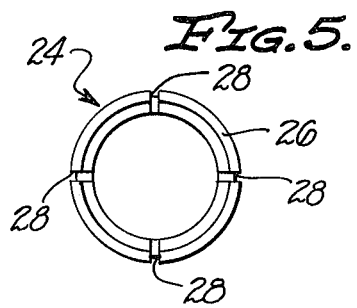

PILE CARPET CASTOR

CROSS-REFERENCE TO RELATED PATENTS

The subject matter of this application is related to the subject matter of U.S. Pat. No. 3,899,801, issued Aug. 19, 1975, to Vernon J. Carrier, entitled "CASTOR FOR USE WITH PILE CARPET" and is related to the subject matters of the references cited in this U.S. patent.

BACKGROUND OF THE INVENTION

This specification pertains to new and improved castors which are primarily intended for use with so-called "pile carpet" but which are capable of being utilized in other applications.

The term "pile carpet" is commonly employed to designate a heavy fabric or fabric type structure for use in covering a floor or similar surface which is constructed so as to include surface fibers projecting upwardly from the principal portion of such a covering. These upwardly extending fibers are frequently referred to as the "pile" of the carpet. They may be either cut off so as to extend upwardly as more or less cantilevered beams or they may be upwardly extending loops of a continuous fiber.

In the past it has been recognized that when the pile on a carpet is held under compression as, for example, under a conventional cylindrical castor roller, for a prolonged period that such pile will tend to be distorted so as to "matt" downwardly from a normal position so as to lie roughly parallel to the principal portion of the carpet. To a large extent, this is a result of weight being concentrated on the wheel of a castor so as to be transmitted to only a limited portion of the surface of a carpet. It has also been recognized that it is possible to minimize such matting of pile carpet to various extents through the use of various expedients.

Obviously, the more the weight applied to the carpet through a castor wheel or roller is spread through a large area, the less the tendency for the carpet to matt under such a roller. It has also, however, been recognized that it is more desirable to prevent carpet matting by utilizing a roller of comparatively large length having a plurality of non-pointed bosses which will engage the pile of a carpet in such a manner as to "break up" the load applied to the carpet. The use of such bosses is considered desirable because to a certain extent such bosses tend to fit against the fibers of the pile on a carpet in such a manner as to spread the load so as to minimize matting and in such a manner as to tend to prevent a pile carpet surface from being uniformly compressed.

Although comparatively long rollers provided with such bosses are quite desirable and utilitarian, a problem has been encountered in connection with them. This problem concerns the turning or rotation of a castor about a vertically oriented axis. During such rotation the two different ends of a comparatively elongated roller turn different amounts. The bosses on a comparatively elongated roller type castor wheel have been found to tend to impede the rotation of a castor about a vertically oriented axis. This problem is more pronounced than with a roller having a completely smooth exterior surface because a smooth surface will tend to slip relative to carpet more easily than a wheel having exterior projections or bosses tending to fit downwardly within the fibers of the pile of a carpet.

It has been believed that it would be possible to remedy this problem by utilizing a series of comparatively thick, separate wheels, each of which is provided with a series of surface projections, mounted in such a manner that the wheels would rotate independently of one another. It is considered that this type of expedient is disadvantageous from a practical standpoint because of the possibility of the fibers within a carpet pile entering the space between the wheel and tending to "bind up" between adjacent wheels in such a manner as to effectively prevent or preclude rotation of the wheels. Further, it is considered that with this type of structure that there is danger of the pile within a carpet being damaged as a result of relative movement between the wheels at different rates as, for example, when a castor is turned about a vertically oriented axis.

BRIEF SUMMARY OF THE INVENTION

It is believed that it will be apparent from the preceding that there is a need for new and improved castors which are primarily intended for use with pile carpet. A broad objective of the present invention is to fulfill this need. More specifically, this invention is intended to provide pile carpet castors having comparatively long wheels provided with peripheral bosses along their lengths but which eliminate the disadvantages of such wheels encountered on turning or rotation about a vertically oriented axis.

A further objective of the present invention is to provide new and improved pile carpet castors which minimize the matting of carpet pile and which can be turned and used with relative ease without there being any significant danger or chance of even comparatively long fibers on a pile carpet being damaged. Another objective of the invention is to provide castors, as described, which are comparatively easy to manufacture at a comparatively nominal cost and which are capable of giving prolonged, reliable service in their intended application.

In accordance with this invention, these various objectives of the invention are believed to be achieved in a castor for use with pile carpet including an elongated axle, a support means for supporting the axle and means for contacting a carpet rotatably mounted on the axle by the improvement which comprises: the means for contacting a carpet comprising a plurality of separate wheels, a sleeve and a holding means for securing the wheels on the sleeve. Each of the wheels employed has parallel sides, a centrally located hole, a generally cylindrical periphery located about the hole in each wheel, and a plurality of bosses located on its periphery so as to extend therefrom, these bosses being equally spaced from one another, having a non-pointed configuration and being shaped so that their ends, remote from the wheel upon which they are located, are smaller than their bases.

The wheels used are located in side-by-side relationship with the holes in alignment with one another and with the sleeve being rotatably mounted on the axle and fitting closely against the interiors of the holes in such a manner that the wheels are capable of rotation relative to the sleeve. The holding means frictionally secure the wheels with the adjacent sides of the wheel abutting against one another so that normally the wheels rotate together as a unit and so that the wheels are capable of independent rotation as may be required as the castor is turned about a vertically oriented axis.

BRIEF DESCRIPTION OF THE DRAWING

The invention to which this specification pertains is best more fully described with reference to the accompanying drawing in which:

FIG. 1 is a side elevational view of a presently preferred embodiment or form of a pile carpet castor in accordance with the invention set forth in this specification;

FIG. 2 is a cross-sectional view at an enlarged scale taken at line 2—2 of FIG. 1 in which a sleeve employed is illustrated in elevation;

FIG. 3 is a partial cross-sectional view corresponding to a part of FIG. 2 at an enlarged scale in which this sleeve is illustrated in section;

FIG. 4 is a side elevational view, partially broken away, illustrating the sleeve referred to in connection with the preceding two figures; and FIG. 5 is an end elevational view of this sleeve.

The features of the invention which are set forth and defined in the appended claims and which are embodied within the illustrated castor are believed to be of such a character as to be capable of being utilized in a number of somewhat differently appearing and somewhat differently constructed castors through the use of exercise of routine mechanical engineering skill.

DETAILED DESCRIPTION

In FIG. 1 of the drawing there is shown a castor 10 of the present invention which is constructed so as to include a vertically oriented shaft 12 adapted to be mounted in any conventional manner so that the remainder of the castor 10 is capable of being rotated about a vertically extending axis. If desired, the shaft 12 may include a conventional retaining groove (not shown) or the like for the purpose of securing it in position. This shaft 12 is secured to a conventional yoke 14 which is employed so as to hold a conventional axle 16 so that the axle 16 extends between bearing openings 18 in legs 20 of the yoke 14. Conventional enlargements 22 or equivalent structures are located on the axle 16 against the legs 20 so as to secure the axle 16 in place. It will, of course, be recognized that this structure of the shaft 12, the yoke 14 and the axle 16 is conventional. If desired, various known equivalent structures may be substituted for use in accordance with the invention.

The invention itself involves the use of an elongated sleeve 24 which is slightly shorter than the distance between the legs 20 of the yoke 14. This sleeve 24 is essentially cylindrical in configuration and is provided with bent over beveled or flanged ends 26 and slots 28 disposed equal distances from one another around the ends 26 which extend parallel to the axis of this sleeve 24. The internal diameter of the sleeve 24 is larger than the external diameter of the axle 16 so that this sleeve 24 may turn freely upon this axle 16. If desired, an appropriate lubricant or lubricant coating may be utilized to facilitate rotation of the sleeve 24 on the axle 16. Further, if desired, conventional bearings (not shown) can be used for this purpose, although this is not preferred for economic reasons.

The sleeve 24 fits closely against the interiors of holes 30 which are formed in a plurality of comparatively thin wheels 32. These wheels 32 are of a generally disk-like configuration and are formed so as to have cylindrical peripheries 34 located symmetrically about the holes 30. Each of the wheels 32 has a single row of non-pointed projections or bosses 36 located on its periphery 34. These bosses 36 are preferably all identical to one another and are located so as to be spaced equidistant from one another. Further, these bosses 36 preferably are shaped so that their bases 38 adjacent to the peripheries 34 are larger than their ends 40 spaced from these peripheries 34. Preferably, these ends 40 are rounded slightly and are smaller than the bases 38 so that these bosses 36 will tend to fit "within" the fibers of a pile carpet and will tend to push adjacent fibers between individual bosses 36 toward one another so as to transmit a portion of the load applied through a castor 10 in more or less of a sideways manner as well as directly down.

These wheels 32 have flat, parallel sides 42 and are located with respect to one another on the sleeve 24 so that various sides 42 abut against and frictionally engage one another. Preferably, these sides 42 are as smooth as reasonably possible so as to tend to prevent any fiber or fabric from getting between the sides 42 as the castor 10 is used. The various individual wheels 32 are held in this side-by-side relationship to one another because of the action of the ends 26 against beveled surfaces 44 on the wheels 32 adjacent to these ends 26. For convenience of manufacture, similar surfaces 44 may be located on all the wheels 32.

With this construction, the inherent resiliency of the sleeve 24 and more particularly, the resiliency of the ends 26 of the sleeve 24 tends to bias the wheels 32 into frictional engagement with one another so that these wheels 32 are held under compression in such a manner that they will normally rotate as a unit. However, because the wheels 32 are not directly secured to one another, these wheels 32 are capable of rotating relative to one another as, for example, when the castor 10 is being turned about a vertical axis as a result of different frictional forces exerted against different of the wheels 32. This is considered to be advantageous and desirable in facilitating the castor 10 being used with a minumum of difficulty and without significant danger of individual fibers within a carpet pile being damaged. In order to achieve this resilient holding action, it is considered that the sleeve 24 should be formed of a resilient metal.

For the castor 10 to operate so that normally the wheels 32 will rotate as a unit, so that the wheels 32 can rotate independently of one another under castor turning conditions, it is necessary to control with reasonable accuracy, the friction tending to impede relative rotation between adjacent wheels 32. Such friction, of course, can be controlled to a large extent by regulating the pressure exerted by the ends 26 against the wheels 32 adjacent to these ends 26. The friction can also be regulated by providing circular recesses 46 in the sides 42. Such recesses 46 are considered desirable in minimizing material. The closeness of the fit of the sleeve 24 within the holes 18 is also important in controlling the amount of force required to cause relative rotation between various wheels 32. Because of different coefficients of friction and the like, it is considered that an individual manufacturer may wish to vary the areas of the wheels 32 in engagement with one another and the sleeve 24 in accordance with the compressive forces exerted by the ends 26.

It is considered that the assembly of the wheels 32 on the sleeve 24 is desirable as a separate product for commercial purposes for a reason which is somewhat unrelated to the manner in which the castor 10 operates. This assembly may be easily and conveniently constructed as a unit by temporarily deforming the sleeve 24 and "popping" it into place. The slots 28 are important in making possible this manner of assembly. After being constructed, this assembly may be easily and conveniently shipped by a first manufacturer to another manufacturer for use with such other manufacturer's supporting structure. Thus, for example, such an assembly can be used by different castor manufacturers for use with a shaft 12, a yoke 14 and an axle 16 constructed with existing tooling.

I claim:

1. A castor for use with pile carpet, said castor including an elongated axle, a support means for supporting said axle, and means for contacting a carpet rotatably mounted on said axle in which the improvement comprises:

said means for contacting a carpet comprising a plurality of separate wheels, a sleeve and holding means for securing said wheels on said sleeve, each of said wheels having parallel sides, a centrally located hole, a generally cylindrical periphery located symmetrically about said hole in each wheel, and a plurality of bosses located on its periphery so as to extend therefrom, said bosses on each of said wheels being equally spaced from one another, being of a non-pointed configuration and being shaped so that the ends of said bosses remote from the peripheries of said wheels are smaller than the portions of the bosses at the peripheries of said wheels, said wheels being located in side-by-side relationship to one another with said holes in alignment with one another, said sleeve fitting around said axle so as to be rotatably mounted on said axle and fitting closely against the interior of each of said holes, said wheels fitting with respect to said sleeve so as to be capable of rotation relative to and about said sleeve, said holding means frictionally securing said wheels with the adjacent sides of said wheels abutting against one another so that normally said wheels will rotate together as a unit and so that said wheels are capable of rotating independently of one another.

2. A castor as claimed in claim 1 wherein:
said holding means are flanged ends located on said sleeve.

3. A castor as claimed in claim 1 wherein:
said sleeve includes slots extending from each of its ends parallel to its axis, said slots being sufficiently large so as to permit said sleeve to be temporarily distended so as to be assembled relative to said wheels.

4. A castor as claimed in claim 3 wherein:
said flanged ends are beveled ends, and
the two of said wheels furthest removed from one another are provided with beveled surfaces, said beveled ends fitting against said beveled surfaces.

* * * * *